US012007067B2

(12) United States Patent
Zawada

(10) Patent No.: US 12,007,067 B2
(45) Date of Patent: Jun. 11, 2024

(54) RAISABLE OR ROTATABLE BED FOR CONSOLE

(71) Applicant: Lukasz Zawada, Niechobrz (PL)

(72) Inventor: Lukasz Zawada, Niechobrz (PL)

( * ) Notice: Subject to any disclaimer, the term of this patent is extended or adjusted under 35 U.S.C. 154(b) by 696 days.

(21) Appl. No.: 17/151,815

(22) Filed: Jan. 19, 2021

(65) Prior Publication Data
US 2021/0239259 A1 Aug. 5, 2021

Related U.S. Application Data

(60) Provisional application No. 62/961,853, filed on Jan. 16, 2020.

(51) Int. Cl.
*F16M 11/24* (2006.01)
*F16F 9/02* (2006.01)

(52) U.S. Cl.
CPC ........... *F16M 11/24* (2013.01); *F16F 9/0245* (2013.01); *F16M 2200/025* (2013.01)

(58) Field of Classification Search
CPC .. F16M 11/10; F16M 11/18; F16M 2200/025; F16M 11/24; F16F 9/0245
USPC ........................................................ 206/314
See application file for complete search history.

(56) References Cited

U.S. PATENT DOCUMENTS

| 3,750,516 | A | * | 8/1973 | Olson | G10H 1/32 984/344 |
| 4,380,947 | A | * | 4/1983 | Nishimoto | G10H 1/32 84/354 |
| D269,480 | S | * | 6/1983 | Peterson | D14/193 |
| 4,479,240 | A | | 10/1984 | McKinley, Jr. | |
| 4,488,468 | A | * | 12/1984 | Peterson | G10H 1/34 84/DIG. 25 |
| 4,545,280 | A | * | 10/1985 | Bisey | G10H 1/32 248/680 |
| 4,641,565 | A | * | 2/1987 | Tachida | G10C 1/02 984/52 |

(Continued)

FOREIGN PATENT DOCUMENTS

CN          207 801 949 U      8/2018

OTHER PUBLICATIONS

International Search Report dated May 3, 2021 in corresponding PCT International Application No. PCT/IB2021/050358.

(Continued)

*Primary Examiner* — Ernesto A Grano
(74) *Attorney, Agent, or Firm* — OSTROLENK FABER LLP

(57) ABSTRACT

Disclosed is a console bed mechanism to provide access to controls on console bed transported in a transport case. The console bed mechanism may include a base plate positioned in the transport case and comprising a bearing, an upper plate secured to the console bed and connected via the bearing to the base plate, a rotation arm having a lower end mounted to the base plate and an upper end mounted to the upper plate, the rotation arm configured to rotate the console bed between: a transport position in which the console bed is at least partially in the transport case, and an operation position in which the console bed is at least partially above the transport case and is positioned to be operated, and also including an elevation arm that raises the console bed and having a lower end mounted to the transport case and an upper end secured to the base plate.

10 Claims, 8 Drawing Sheets

(56) References Cited

U.S. PATENT DOCUMENTS

| | | | | |
|---|---|---|---|---|
| 5,149,905 | A * | 9/1992 | Count | G10H 1/32 |
| | | | | 84/327 |
| 5,248,846 | A * | 9/1993 | Koike | G10H 1/0091 |
| | | | | 84/718 |
| 5,312,076 | A * | 5/1994 | Rogov | F16M 11/041 |
| | | | | 248/163.1 |
| 5,452,951 | A * | 9/1995 | Peller | H05K 7/16 |
| | | | | 108/6 |
| 5,465,644 | A * | 11/1995 | Shimoda | G10C 3/02 |
| | | | | 84/DIG. 17 |
| 5,866,829 | A * | 2/1999 | Pecoraro | G10H 3/186 |
| | | | | 84/177 |
| 5,933,507 | A | 8/1999 | Woolley et al. | |
| 6,068,355 | A * | 5/2000 | Thorp | A45C 9/00 |
| | | | | 108/177 |
| 6,087,574 | A * | 7/2000 | Kitashima | G10H 1/346 |
| | | | | 84/423 R |
| 6,336,691 | B1 * | 1/2002 | Maroney | H05K 7/20127 |
| | | | | 312/236 |
| 6,349,029 | B1 * | 2/2002 | Leman | G06F 1/18 |
| | | | | 70/32 |
| 6,371,495 | B2 * | 4/2002 | Thompson | B62B 1/12 |
| | | | | 108/14 |
| 6,399,870 | B1 * | 6/2002 | Azima | H04R 7/045 |
| | | | | 381/431 |
| 6,501,650 | B2 * | 12/2002 | Edmunds | H05K 7/20572 |
| | | | | 361/695 |
| 6,929,268 | B1 * | 8/2005 | Owens | B62B 3/008 |
| | | | | 280/37 |
| 7,078,611 | B2 * | 7/2006 | Izumi | G10H 1/32 |
| | | | | 84/743 |
| 7,329,812 | B2 * | 2/2008 | Kuwahara | G10C 3/02 |
| | | | | 84/744 |
| 7,735,941 | B2 * | 6/2010 | Heathcote | A63F 13/98 |
| | | | | 312/241 |
| 9,326,406 | B2 * | 4/2016 | Brandt | H05K 7/00 |
| 9,432,069 | B2 * | 8/2016 | Rowe | H04H 60/04 |
| 9,585,267 | B2 * | 2/2017 | Monroe | H05K 5/0217 |
| 10,119,651 | B2 * | 11/2018 | Piovan | F16M 11/048 |
| 10,327,569 | B2 * | 6/2019 | Greensmith | A47F 3/142 |
| 10,606,308 | B2 * | 3/2020 | Jamele | A63F 13/27 |
| 2004/0173086 | A1 * | 9/2004 | Sato | G10H 1/32 |
| | | | | 84/745 |
| 2005/0066798 | A1 * | 3/2005 | Naito | G10H 1/32 |
| | | | | 84/743 |
| 2005/0155486 | A1 * | 7/2005 | Furuhashi | G10H 1/32 |
| | | | | 84/746 |
| 2012/0242052 | A1 | 9/2012 | Monroe | |
| 2015/0103026 | A1 | 4/2015 | Heiniger et al. | |

OTHER PUBLICATIONS

Written Opinion dated May 3, 2021 in corresponding PCT International Application No. PCT/IB2021/050358.

* cited by examiner

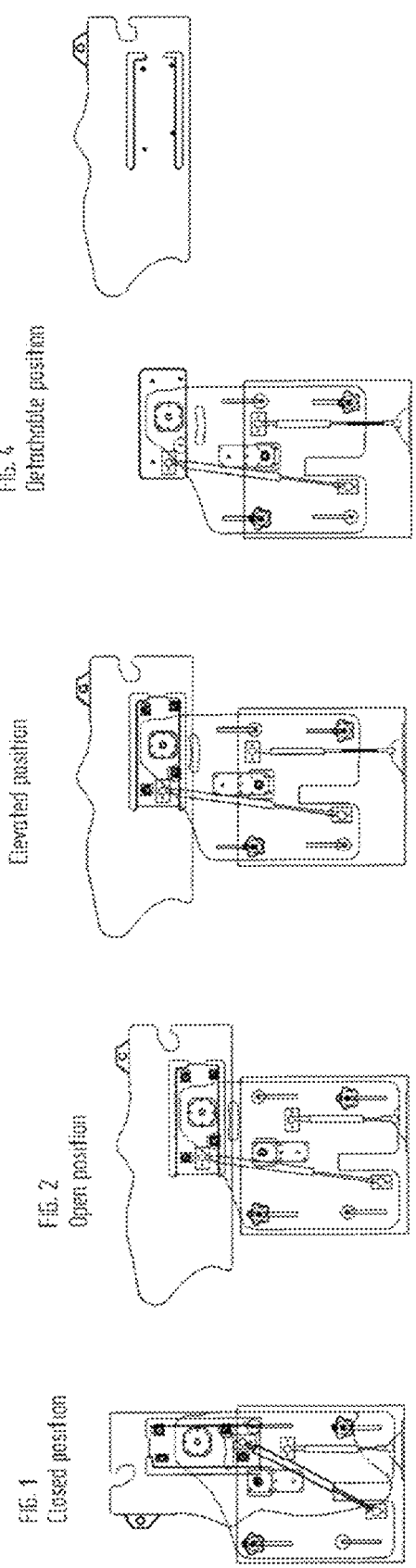

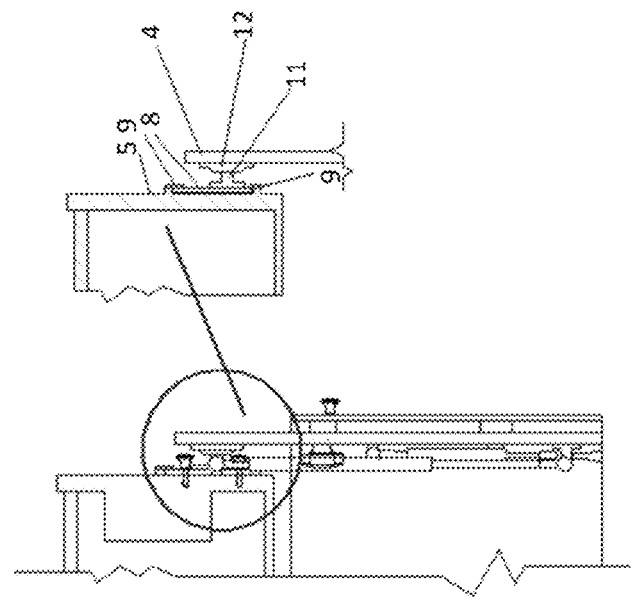
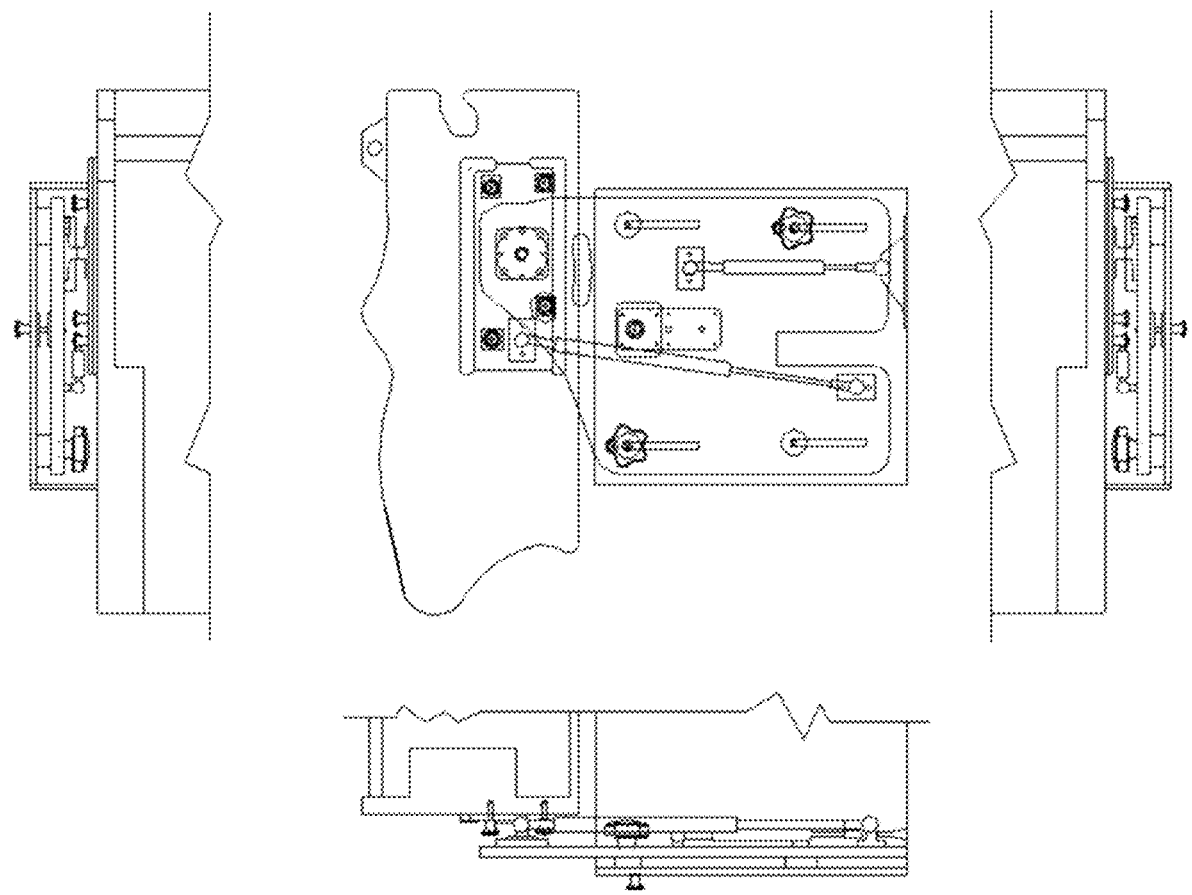
FIG. 6

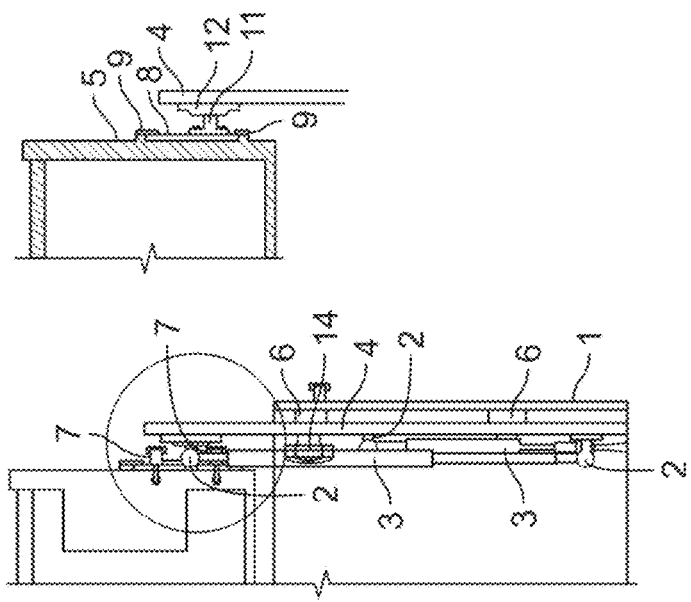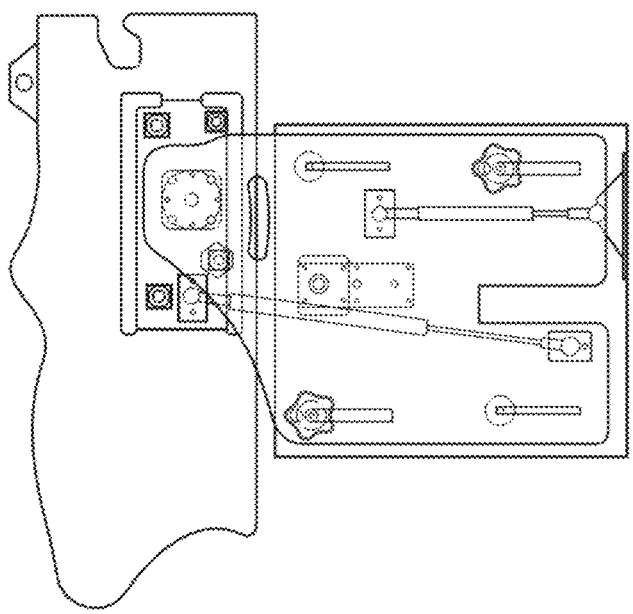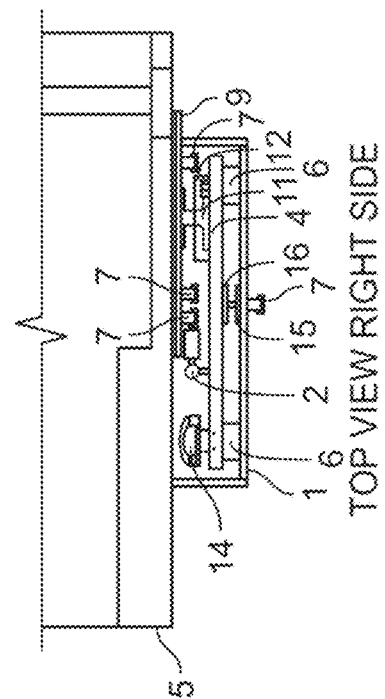
FIG. 6B

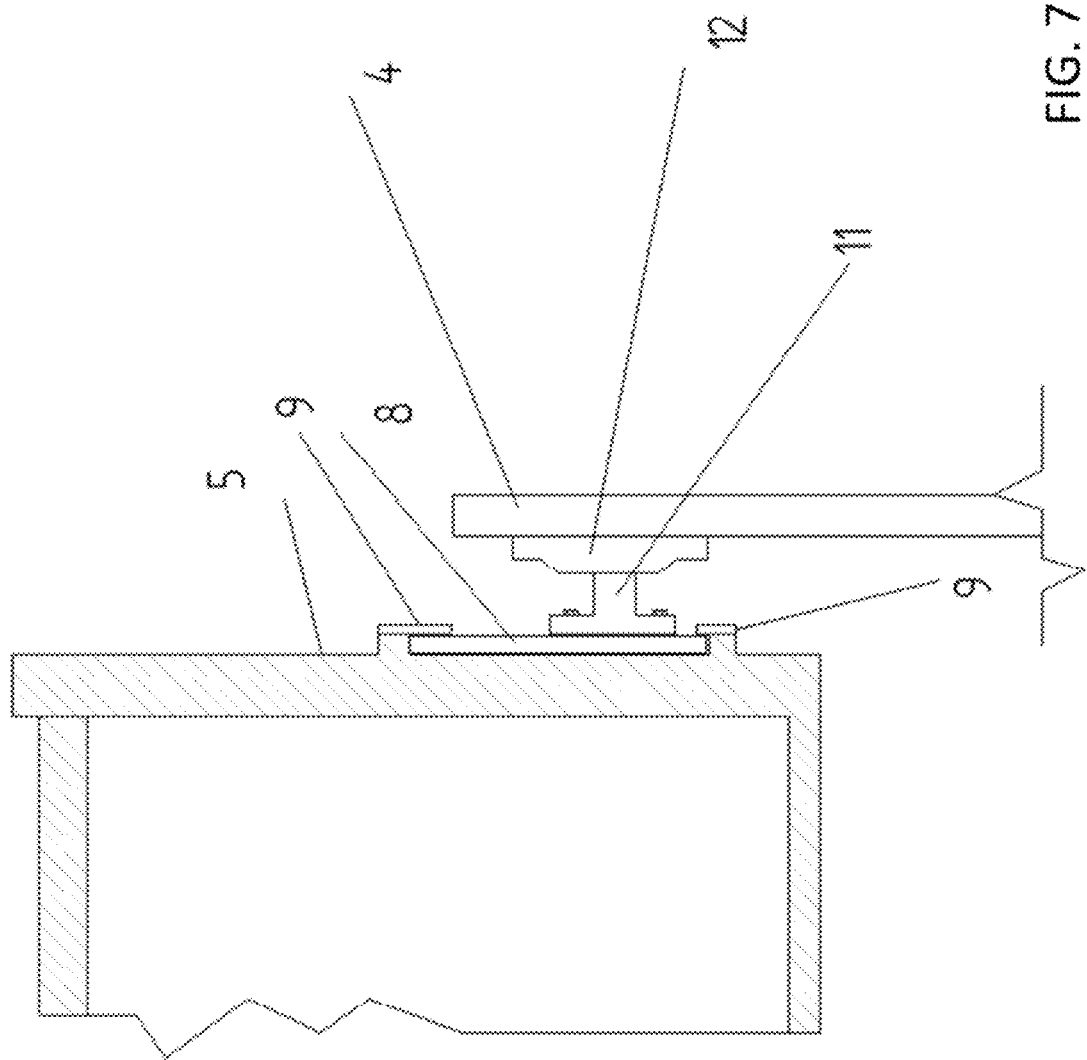

RAISABLE OR ROTATABLE BED FOR CONSOLE

CROSS-REFERENCE TO RELATED APPLICATION

The present application claims priority to U.S. Provisional Patent Application 62/961,853 filed Jan. 16, 2020, the entire contents of which are incorporated herein by reference.

FIELD OF THE INVETION

The present invention relates to the field of supports and transportation cases for consoles of the type used by disk jockeys and engineers for audio or video production and performance and, in particular, to a console bed that is portable and includes a mechanism to facilitate deployment and use of the console.

BACKGROUND OF THE INVENTION

Disk jockeys (DJs) and other performers, audio engineers and other producers or recorders of music or other sound, or concert or stage lighting or the like often need to control or operate complex and heavy audio or lighting consoles and other equipment, including video or audio production equipment, to create or playback, display, mix or perform music or other audio, video, lighting, visual, sound or other effects, or combinations of the foregoing. Such consoles may be used in recording, producing, performing, playing or replaying, or broadcasting of sound, lighting, video or other media and/or a combination of the foregoing, and may be used in concert halls, party spaces or other entertainment venues or the like. Such consoles often need to be transported to a venue and then set up there by the operator, such as a DJ or the like.

Mixing consoles, including portable mixing consoles and systems for carrying and adjusting consoles are well known. For example, Woolley, U.S. Pat. No. 5,933,507, McKinley, U.S. Pat. No. 4,479,240, and Heiniger, 2015/0103026 are known. Each of these references is incorporated in full herein by reference. However, such consoles are often quite heavy and unwieldly to transport and set up at the target venue where and when they are needed.

SUMMARY OF THE INVENTION

Described is a support system and carrying case or bed for a digital or analog console, such as a mixing console or DJ controller of the type used by disk jockeys and sound engineers. A mechanism of a versatile mechanism of the bed and carrying or transport case of an electronic console that may provide raising/lowering and tilting/rotating flip/tilt flight case. A rotation mechanism and a raising/lowering mechanism may include one or more movement arms, such as gas springs.

Such a console bed mechanism may provide access to a console bed transported in a transport case. The console bed mechanism may include:
- a base plate positioned in the transport case and comprising a bearing;
- an upper plate secured to the console bed and connected via the bearing to the base plate;
- a rotation arm having a lower end mounted to the base plate and an upper end mounted to the upper plate, the rotation arm configured to rotate the console bed between:
  - a transport position in which the console bed is at least partially in the transport case, and
  - an operation position in which the console bed is at least partially above the transport case and is positioned to be operated; and
- an elevation arm configured to raise the console bed.

In such a console bed mechanism, the elevation arm may have a lower end mounted to the transport case and an upper end secured to the base plate.

In such a console bed mechanism according, the elevation arm may raise the console bed to a second operation position with a second height different from the height of the operation position, such that the second height is set by the user.

In such a console bed mechanism, the second height may be preset for the console bed mechanism prior to activation of the rotation arm.

In such a console bed mechanism, when the elevation arm moves the console bed to the second operating position, the elevation arm may apply pressure to a bottom wall of the transport case so as to lift the console bed.

In such a console bed mechanism, the elevation arm may work in concert with the rotation arm to move the console bed from the transport position to the operating position.

Such a console bed mechanism may further include a locking knob positioned and configured to be loosened and connected to a vibration isolator, such that when the console bed is in the operating position, the elevation arm raises a working level of a control panel of the console bed only after the locking knob is loosened to allow the elevation arm to raise the console bed together with the base plate to a first operating position.

Such a console bed mechanism may further include a small base plate in the transport case and a small base plate retaining pin that is moveable into the small base plate so as to maintain the base plate and the console bed in the operating position.

Such a console bed mechanism may further include an upper plate retaining pin configured to secure the console bed to the upper plate when the upper base retaining pin is inside the upper plate, such that the console bed is detached from the transport case and the console bed mechanism when the upper plate retaining pin is removed from the upper plate.

In such a console bed mechanism, when the upper plate retaining pin is removed from the upper plate, the console bed may be removable from the console bed mechanism only by being pulled backward.

A transport case and a console in combination with such a console bed mechanism are also contemplated.

BRIEF DESCRIPTION OF THE DRAWINGS

The Drawings illustrate an example of an embodiment of the subject invention, in which:

FIG. 1 shows a side view of the console bed mechanism in the closed position;

FIG. 2 shows a side view of the mechanism in the open position;

FIG. 3 shows a side view of the mechanism in the elevated or raised position;

FIG. 4 shows side view of the detached position;

FIG. 6 shows a side view of mechanism, a front view of the mechanism on the right-hand side of the side view illustration, an enlarged front view on the right-hand side of the front view, and a front view of an additional console bed mechanism provided on an opposing side;

FIGS. 6A-6B show details of the mechanism shown in FIG. 6.

FIG. 7 shows an enlarged front view of a portion of the console bed mechanism, including the joining of the upper plate with the protruding flange and the base plate with the bearing.

Figure 5:
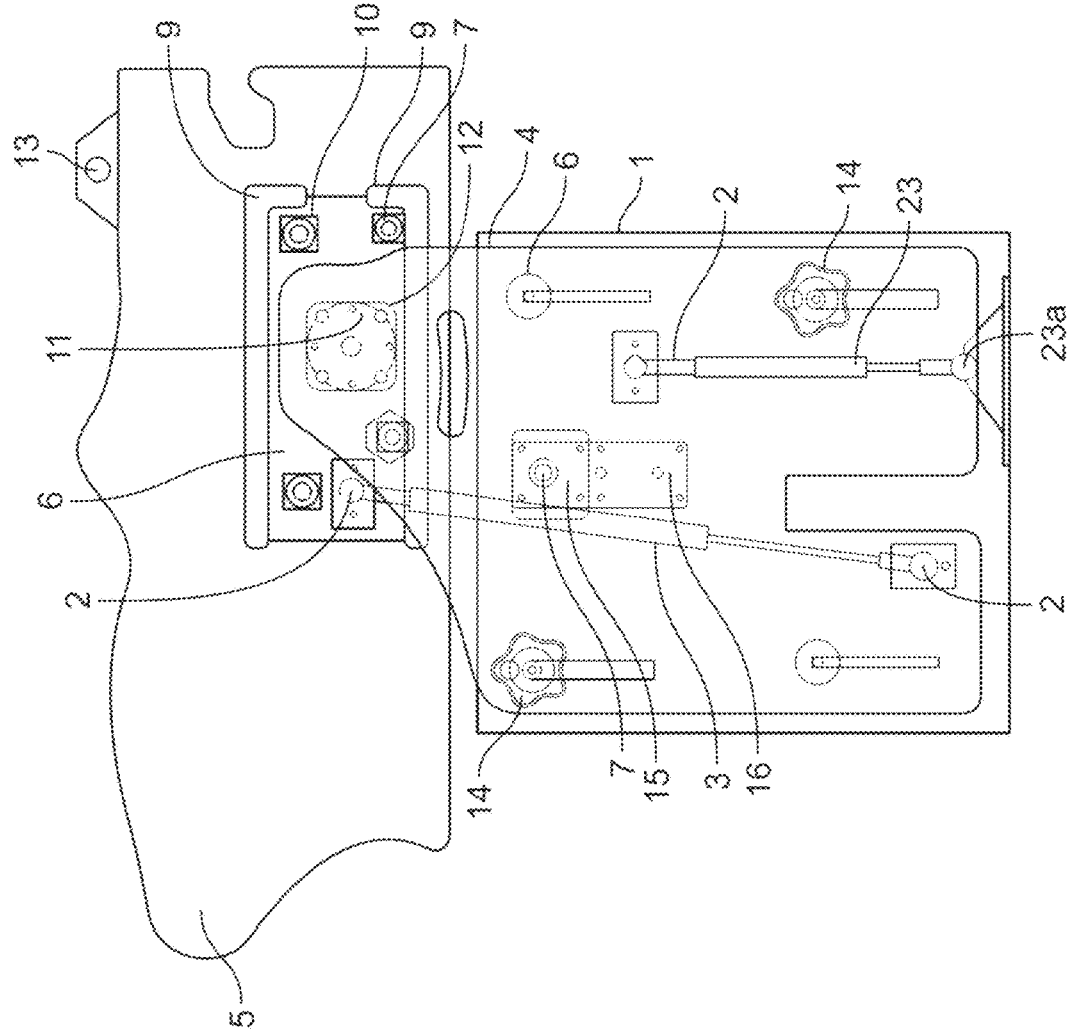
FIG. 5 shows an enlarged side view of the open position of FIG. 2.

The figures of the Drawings illustrate examples of aspects of an embodiment of the invention. Other features and advantages of the present invention will become apparent from the following description of the invention, and/or from the combination of one or more of the figures and the textual description herein, or from portions thereof.

DETAILED DESCRIPTION OF AN EMBODIMENT

Digital and analog electronic components, such as turntables, audio mixers and a variety of other music or other sound creation or reproduction equipment and their controls may be provided on console bed 5 and may be housed in a transport case 1. The console bed may include a rotary mechanism (elements 7, 11, 8, 3, 2) supported by rotation arm 3.

A working height (level of sliders and console potentiometers) may be adjusted to the individual needs of the customer or operator/user, for example, a DJ or audio engineer, depending on his or her preferences and the ability to work in a standing or sitting position using the mechanism lifting elements (2, 3, 14, 15, 6, 5, 7).

The transport case 1 using the mechanism may facilitate opening the crate and lifting the console weighing up to 250 kg by one person, where a classic case needs four or more people.

The transport case 1 also may include a vibration isolation system 6 of the entire console bed system to reduce vibrations arising in transport and a present embodiment may be the first such use of this element in the console transport cases.

The transport case 1 may also include a detach mechanism to detach the console bed which allows the console to be removed from the chest elements (8, 7, 9, 10, 5).

There may be two arms: rotation arm 3 and elevation arm 23. One or both of these may be a hydraulic or other type of piston and cylinder movement mechanism, including as a gas spring, or other spring. Such a gas spring may include a piston that is partially inside a cylinder and protrudes out of the cylinder to varying extents to control the length of the arm as a whole. It will be understood that other types of urging members or springs may also be used, for example, other types of compression springs or tension springs, and other arrangements, such as static struts with an expandable arm to control rotation for rotation arm 3 for the rotation of the mechanism, an expandable arm for the elevation arm 23 for the lifting, and possibly lowering, mechanism. Elevation arm 23 may have a lower end 23a attached to lower side or bottom wall of transport case 1.

One or more additional rotation arms 3' and/or one or more additional elevation arms 23' may be provided on a same side as the side shown or on a second side of the console (not visible in FIGS. 1-5).

Clamping knobs 14 may be screwed on with a screw from the vibration-isolator 6. Knobs may be two per side: two on left and/or two on right. The locking/retaining screw(s) or pin(s) 7 may be pushed through the upper plate 8 to the side of the console bed 5. Locking/retaining screw(s) or pin(s) 7 may have locks that enable/disable its/their removal by allowing/disallowing it/them to be pulled or screwed out. A button may have to be pressed to get it out to collect it.

Small base plate 15 may be mounted to a side wall or other portion of transport case 1. Second base plate 16 may be mounted to, and move with, base plate 4. One or more retaining pins, screws, latches or the like in small base plate 15 may thus secure the console bed 5 and the console bed mechanism 1 relative to the transport case 1 to maintain the console bed 1 in an operating position. The operating position may be a position in which an operator, such as a DJ or other performer, audio engineer, broadcaster or the like has access to a control panel, audio device, music recording or playback system, or the like. In such a position, the console bed may be at a horizontal position or substantially horizontal position. Substantially horizontal positon may mean within a few degrees of being perpendicular to the floor, less than 10 degrees from horizontal, or the like.

Figure 6A:
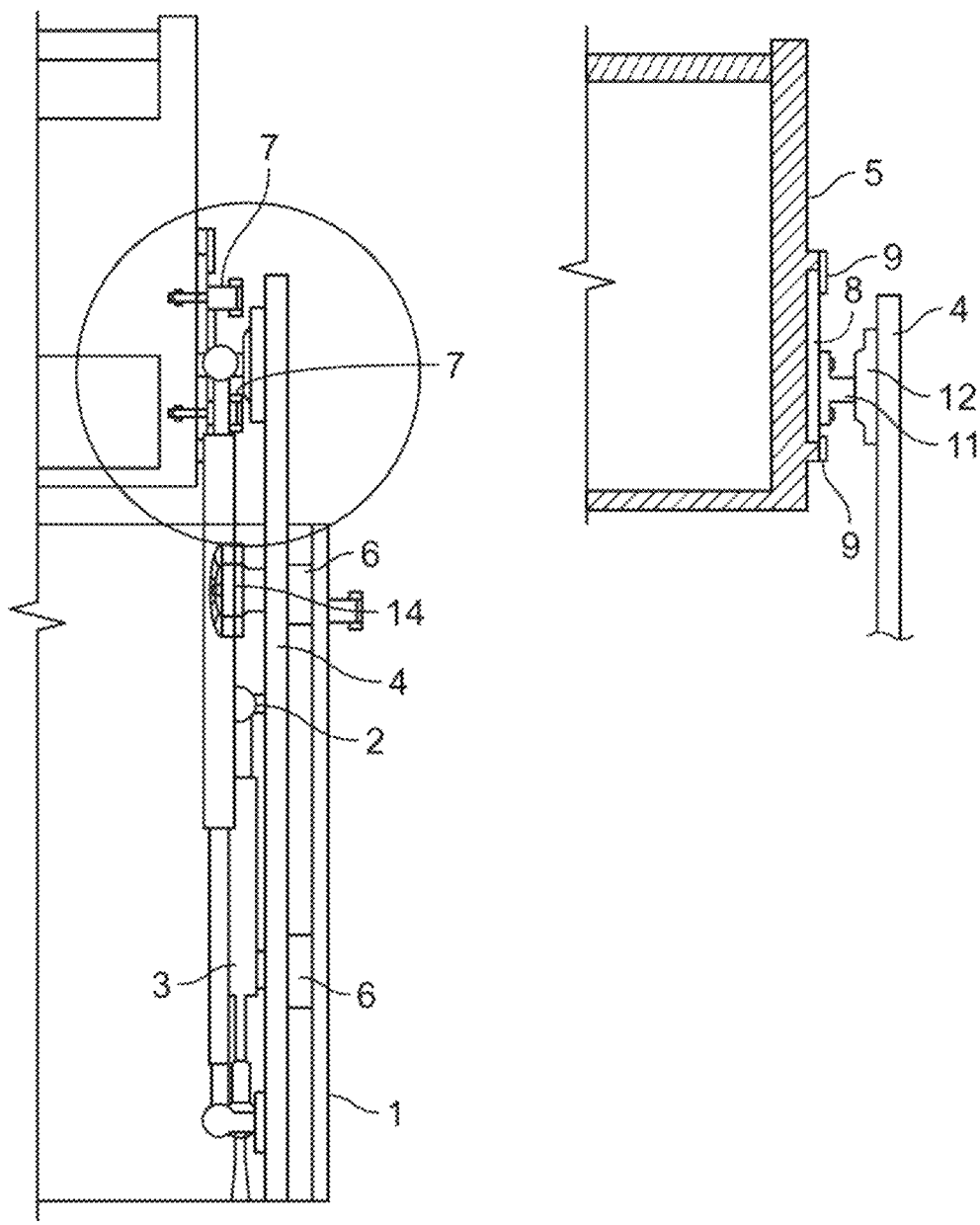

The left-hand side of FIG. 6 is a front-view of an additional console bed mechanism provided on an opposing side of the transport case 1 and the console bed 5. This additional console bed mechanism may be a mirror image of the console bed mechanism shown in the remaining figures and the additional structures thereof may work in concert with corresponding structures illustrated therein to achieve the described functionality. These additional structures may be activated or controlled in a manner analogous to the corresponding structures illustrated.

Rotation Mechanism

To provide access for a DJ, engineer or other technician or performer, the mechanism rotates the console bed 5, moving it from the closed position shown in FIG. 1 to the open position shown, for example, in FIGS. 2, 5 and 6. To initiate rotation of the rotation mechanism, rotation arm 3 is activated, which may lengthen it so as to move console bed 5 from the closed position illustrated in FIG. 1 to the open position illustrated in FIGS. 2, 5 and 6. In this way, a lone human operator, such as a DJ or other performer, recording artist, audio or other engineer, broadcaster or the like may be able to readily and conveniently deploy the console bed 5 from the closed position shown in FIG. 1 to the open position shown in FIGS. 2, 5 and 6 even if the console bed weighs a hundred kilograms or many more.

The rotation mechanism may be scaled from or centered on base plate 4 to which, by means of vibration-insulators 6, it is connected to the body of transport case 1. Console bed 5 may be rotatably connected to base plate 4 via a hinge, such as bearing 12. In particular, hinge or bearing 12 of base plate 4 may be connected to by means of a shaft with flange 11 to upper plate 8. Upper plate 8 may be connected to console bed 5 by means of retaining pins or screws 7. Rotation arm 3 may be oriented offset from the vertical position with respect to the base plate 4 to facilitate rotation of the upper plate 8 with respect to the base plate 4, as shown in FIGS. 2, 5 and 6. Rotation arm 3 may be connected by two handles: with one handle at a first end, for example, at a bottom end of the rotation arm 3, to the base plate 4, and by the second handle, for example, positioned at the top end, to upper plate 8. It will be understood that a pair of such rotation arms 3, for example provided as gas springs, may be used together in concert for rotating upper plate 8 and thus console bed 5. For example, a second rotation arm 3', as shown in the left hand side illustration of FIG. 6, may be positioned on a second side of the base plate 4, and/or two or more rotation arms or gas springs 3' (not shown) may be positioned adjacent to each other or on a same side of the base plate 4 as the rotation arm 3. Rotation arm 3 may rotate the console bed 5 to be horizontal or substantially horizontal position by rotating it approximately 90 degrees.

Lifting Mechanism

The lifting mechanism may include base plate 4 which may be connected to the vibration-isolators 6 by means of screws and a clamping knob with lock 14. The lifting mechanism uses elevation arm 23 which may be attached by means of two handles: one handle at lower end to case 1 below, and the upper attacher 2 at the top end to base plate 4. As explained above with respect to rotation arm 3, elevation arm 23 may be embodied in a variety of ways, including as one or more gas springs or as other structures.

Clamping knob 14 may first have to be released to allow elevation arm 23 to lift up console bed 5 to a desired or preset height. Locking pins, screws, bolts 7 may then be used to latch or secure through small plate 15 and second base plate 16. It will be understood that more than one locking pin, screw or bolt may be provided in or through small plate 15 and second base plate 16. Also several such small plates 15 and second base plate 16 may be provided on each side of console bed mechanism.

Figure 8:
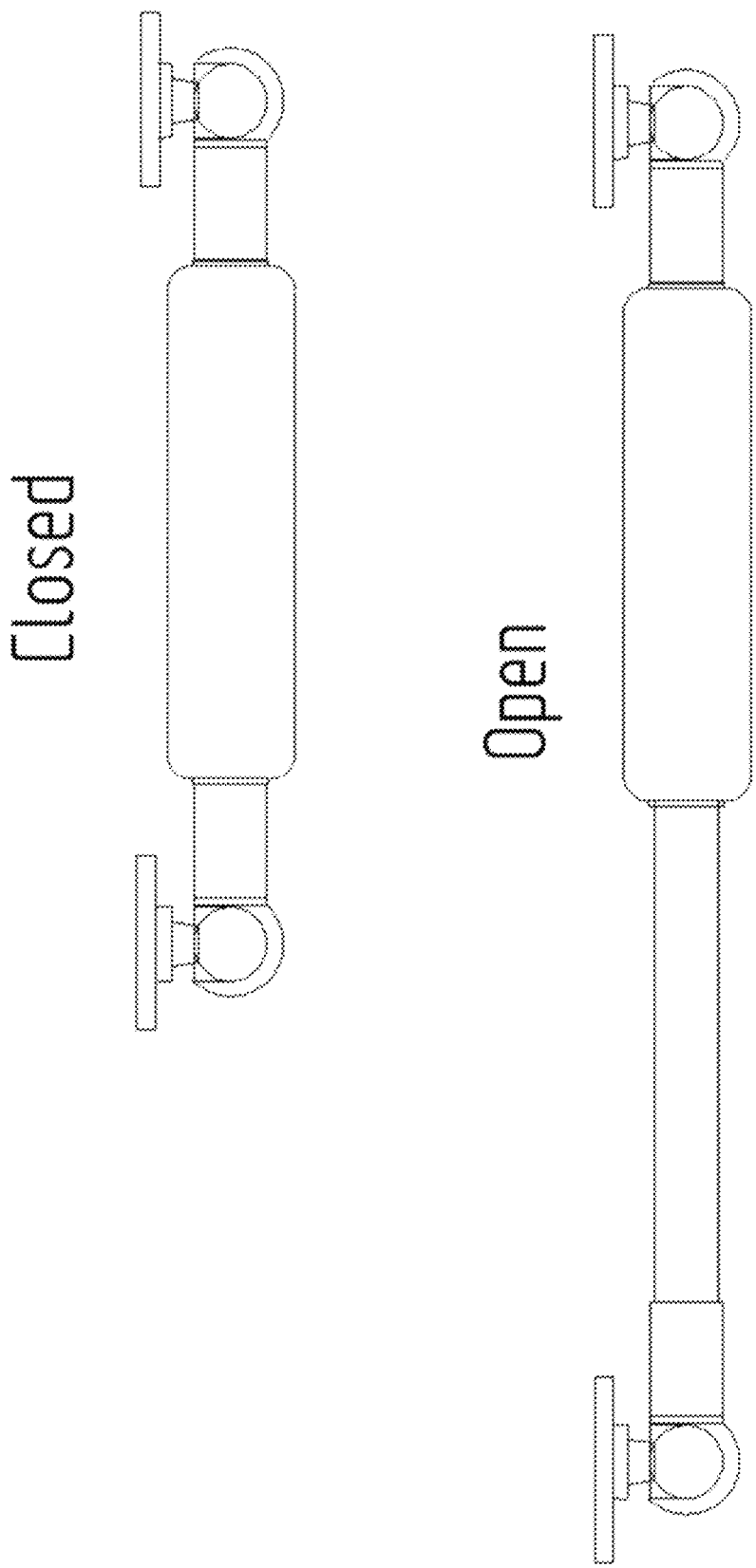
FIGS. 8 and 9 show an example of a movement arm illustrated as comprising gas springs.
Figure 9:
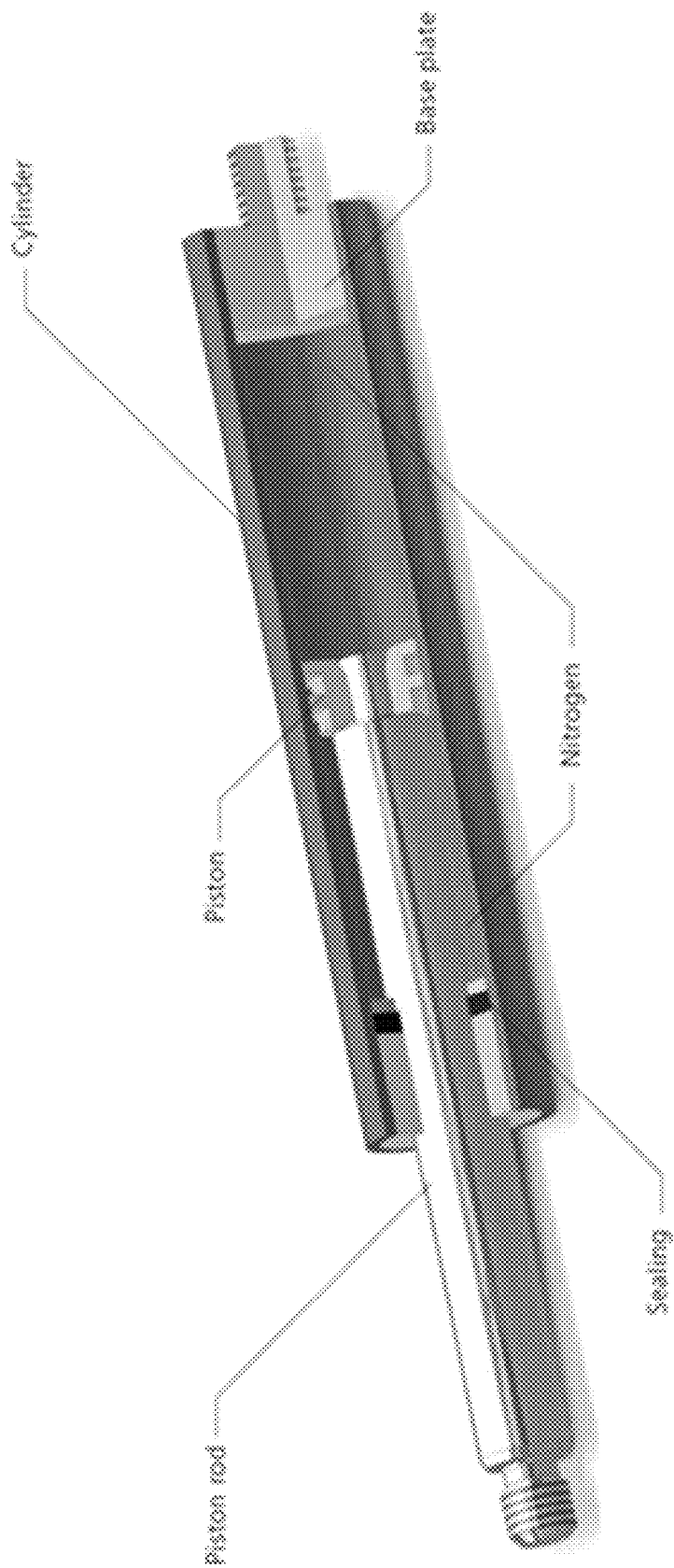

To move from the closed position illustrated in FIG. 1 to the open or operation position illustrated in FIG. 2, rotation arm 3 may be activated so that it rotates the console bed 5 about flange 11. Flange 11 may protrude out from upper plate 8 into bearing 12 of base plate 4. To return console bed 5 to the closed position shown in FIG. 1, the console bed 5 may be pressed down and a gas spring in rotation arm 3 may be activated. Activation of the rotation arm 3 and of the elevation arm 23 may be manual or automatic. Rotation arm 3 and elevation arm 23 may each comprise an urging member, such as a spring, for example, the gas spring as shown in FIGS. 8 and 9. For example, such a spring may be a compression spring so that the operator is assisted by the bias of the spring to perform some of the work of lifting the console bed 5.

To move from the operation position illustrated in FIG. 2 to the elevated position illustrated in FIG. 3, clamping know 14 may be released, then elevation arm 23 may be activated to lift base plate 4 together with console bed 5. In this lifted position, the base plate 4 may be secured by insertion of locking pin or bolt 7 into small base plate 15 and second base plate 16.

To detach console bed 5 as shown in FIG. 4, locking pin or bolt 5 may first be removed and then the console bed 5 may be slid backward. Front views of the mechanism are provided in FIG. 6. Backward may be understood as being toward a back or rear side in a direction opposite to the front. To reattach console bed 5 to the position illustrated in FIG. 3, the console bed 5 may be slid forward onto the console bed mechanism and the transport case 1, and then locking pin or bolt 7 may be reinserted. Console bed 5 may then be pushed down so that elevation arm 23 is hidden, and then clamping knob 14 is locked.

Also illustrated in FIGS. 1-6 is a crescent-shaped slot just below the console bed 5 that may be used to lift the entire machine.

Console bed 5 may be lifted or lowered to a desired height as preferred by the DJ or other person using it. A lifting or lowering action may be initiated by elevation arm 23. When lengthened to obtain the elevated position as shown in FIG. 3, elevation arm 23 may have the effect of lifting base plate 4 with respect to transport case 1, and thus the rising base plate 4 may lift console bed 5. It will be understood that a pair of such elevation gas springs 23 may be used together in concert for the lifting and/or lowering operations. For example, a second elevation arm 23' (not shown) may be positioned on a second side of the base plate 4. For example, two or more elevation gas springs deployed as part of each elevation arm 23' may be positioned adjacent to each other or on a same side of the base plate 4 as the elevation arm 23.

Preset positions according to the preference of a DJ or other person who regularly uses the console bed 5 may be set to control the desired amount of height for the console bed 5. Such a preset height may be obtained by automated control of elevation arm 23 (or by the combination of multiple elevation arms 23 and 23' working in concert). For example, an actuator (not shown) that controls the amount of extension of the piston from the cylinder inside which a gas spring is provided as part of the elevation arm 23 (or the amount of extension of each piston inside the cylinder provided as part of the multiple gas springs 23 and 23') may be programmed to activate the elevation arm 23 for a preset amount of time, or to active with a preset force, so that it lengthens only to a preset length. For example, the piston may lengthen by protruding out of the cylinder for a preset length. Since the length of the elevation arm 23 determines the height of the console bed 5, in this way the height of the console bed 5 desired by a given DJ or other user may be obtained. The height positions of the console bed may be controlled in real time according to operator preference or may be preset in advance of the deployment of the console bed 5 to the operating position.

Detachment Mechanism

The detachment mechanism comprises upper plate 8, which may be attached to the console base 5 using locking screw(s) and/or retaining pins 7, which may be secured to retaining plate 10 of upper plate 8. While four retaining plates 10 are shown it will be understood that more or fewer retaining plates may be provides, and that additional such retaining plates may be provided on another side of upper plate 8. By removing locking screw(s) and/or retaining pins 7 from upper plate 8, console bed 5 may be separated from the transport case 1 and the console bed rotation/elevation mechanism to attain the detached position illustrated in FIG. 4 from the attached position illustrated in FIG. 3. According to an aspect of the disclosure, the console bed 5 may be moved backward to be detached from the console bed mechanism and the transport case 1. Backward may be mean toward a rear of the console bed 5, that is away from the front of the console bed 5 where the console, control panel, audio equipment controls are located and where a DJ or other human operator may be situated to control or monitor the console and work station. Such removal may be important for repairing, cleaning or other types of servicing of the electronic devices or other components of the console that is part of the console bed, for replacing or adding electronic devices or other components, for servicing the console bed rotation and lifting mechanism, or for servicing the transport case 1.

In addition, upper plate 8 may support console bed 5 using pressure plates 9. Illustrated in FIG. 5 are two pressure plates 9 positioned, respectively, above and below the upper plate 8 in the open position, and also positioned below the upper plate 8 in the closed position. It will be understood, however, that a single, integrated pressure plate, or more or fewer than two pressure plates 9 may be provided, and that pressure plates 9 may enclose or substantially enclose the base plate 8 on the two sides (perpendicular to the top and bottom of upper plate 9 shown in FIG. 5). To recouple the console bed 5 from the detachment position illustrated in FIG. 4 to the attached position illustrated in FIG. 3, the console bed 5 may be slid from the back onto the console bed mechanism, and locking pin/bolt/screw 7 may be inserted in console bed 5 to maintain it in position.

In the closed or folded position as shown in FIG. 1, console bed 5 may be lowered down at 90 degrees into transport case 1. In the closed position, the console bed's lodges are pressed against the back of the transport case 1. To get to the open position as shown in FIGS. 2, 5 and 6, the door (not shown) of transport case 1 may first need to be opened.

The console bed 5 is lifted up by rotating 90 degrees to a horizontal or substantially horizontal position.

According to an aspect of the disclosure, the elevated position illustrated in FIG. 3 may be obtained after the console bed 5 is rotated from the closed position shown in FIG. 1 to the open positon shown in FIGS. 2 and 5, to lift up the console bed 5 a desired distance while maintaining it parallel or substantially parallel to the ground. Clamping knobs with lock 14 may first have to be loosened.

Using this solution, it is possible to operate a console weighing 100 kg or more by one person, instead of four to five people needed in traditional versions. In addition, the chest or travel case may become a worktable for a DJ, audio engineer or light engineer on which a console bed rests. It may be possible to raise the console bed to facilitate access and adjusting a control panel of the console at a working height. It may be possible to detach the bed together with the console from the transport case.

Although the present invention is described in relation to particular embodiments thereof, many other variations, combinations of features, and modifications, as well as other uses will become apparent to those skilled in the art. Structures outlined as adjacent need not necessarily be positioned in that way, not all steps or structures illustrated or described need necessarily be provided, and other intervening structures may be inserted in addition or instead of enumerated structures. It is preferred, therefore, that the present invention be limited not by the specific disclosure herein.

REFERENCE NUMERAL LIST 1 transport case
2 upper attachment
3 rotation arm/gas spring
4 base plate
5 console bed
6 vibration isolators
7 locking/retaining pins or screws
8 upper plate
9 pressure plate
10 retaining plate
11 flange with shaft
12 bearing
14 clamping knob with a lock
15 small base plate
16 second base plate
23 elevation arm/gas spring

What is claimed is:

1. A carrier, comprising:
a transport case;
a console bed transported in the transport case;
a console bed mechanism for providing access to the console bed, the console bed mechanism comprising:
a base plate positioned in the transport case and comprising a bearing;
an upper plate detachably secured to the console bed by a removable pin, and connected via the bearing to the base plate, the upper plate being rotatable from a closed position to an open position;
a first gas spring serving as a rotation arm having a lower end mounted to the base plate and an upper end mounted to the upper plate, the rotation arm being connected to the base plate and the upper end plate to rotate the console bed, and being configured to rotate the console bed, between:
(a) a transport position corresponding to the closed position in which the console bed is at least partially in the transport case, and
(b) an operation position corresponding to the open position in which the console bed is at least partially above the transport case and is positioned to be operated, wherein the console bed is no more than ten degrees from the horizontal of the transport case; and
a second gas spring serving as an elevation arm connected to the base plate and the transport case, and configured to raise the console bed into the operation position.

2. The carrier according to claim 1, wherein the elevation arm has a lower end mounted to the transport case and an upper end secured to the base plate.

3. The console bed mechanism according to claim 1, wherein the elevation arm raises the console bed to a second operation position with a second height different from the height of the operation position, wherein the second height is set by the user.

4. The carrier according to claim 3, wherein the second height is preset for the console bed mechanism prior to activation of the rotation arm.

5. The carrier according to claim 1, wherein when the elevation arm moves the console bed to the second operating position, the elevation arm applies pressure to a bottom wall of the transport case so as to lift the console bed.

6. The carrier according to claim 1, wherein the elevation arm works with the rotation arm to move the console bed from the transport position to the operating position.

7. The carrier according to claim 1, further comprising a locking knob positioned and configured to be loosened and connected to a vibration isolator, wherein when the console bed is in the operating position, the elevation arm raises a working level of a control panel of the console bed only after the locking knob is loosened to allow the elevation arm to raise the console bed together with the base plate to a first operating position.

8. The carrier according to claim 1, further comprising a small base plate in the transport case and a small base plate retaining pin configured to be moved into the small base plate so as to maintain the base plate and the console bed in the operating position.

9. The carrier according to claim 1, further comprising an upper plate retaining pin configured to secure the console bed to the upper plate when the upper base retaining pin is inside the upper plate, wherein the console bed is detached from the transport case and the console bed mechanism when the upper plate retaining pin is removed from the upper plate.

10. The carrier according to claim 9, wherein when the upper plate retaining pin is removed from the upper plate, the console bed is removable from the console bed mechanism only by being pulled backward.

* * * * *